United States Patent [19]
Martin

[11] Patent Number: 5,561,684
[45] Date of Patent: Oct. 1, 1996

US005561684A

[54] LASER DIODE PUMPED SOLID STATE LASER CONSTRUCTION

[75] Inventor: Danny W. Martin, Pima, Ariz.

[73] Assignee: Santa Fe Laser Co., Inc., Tucson, Ariz.

[21] Appl. No.: 365,967

[22] Filed: Dec. 29, 1994

[51] Int. Cl.$^6$ ................................................ H01S 3/08
[52] U.S. Cl. ............................ 372/107; 372/101; 372/98; 372/92; 372/72; 372/71; 372/22; 372/34
[58] Field of Search .................................. 372/101, 107, 372/92, 98, 65, 71, 72, 21, 34, 22

[56] References Cited

U.S. PATENT DOCUMENTS

| | | | |
|---|---|---|---|
| 4,730,335 | 3/1988 | Clark et al. | 372/98 |
| 4,731,795 | 3/1988 | Clark et al. | 372/107 |
| 4,739,507 | 4/1988 | Byer et al. | 372/71 |
| 5,048,050 | 9/1991 | Komurasaki | 372/101 |
| 5,381,438 | 1/1995 | Guo et al. | 372/107 |

Primary Examiner—Leon Scott, Jr.
Attorney, Agent, or Firm—Haverstock, Garrett & Roberts

[57] ABSTRACT

A laser device which comprises a base having an optical channel, a laser diode pump source mounted to the base and in thermal conductive relation thereto, the laser diode pump source positioned in alignment with the optical channel, a laser gain medium mounted in the optical channel and capable of being excited to establish a lasing condition, a lens mounted in the optical channel and positioned between the laser diode pump source and the laser gain medium and aligned with the laser diode pump source and the laser gain medium, a power supply for energizing the laser diode pump source to produce a lasing condition therein to produce an output of lasing energy, the output directed to the lens and focused on the laser gain medium to excite the laser gain medium to establish a lasing condition for producing a beam, and a mirror mounted in alignment with the optical channel adjacent the laser gain medium.

22 Claims, 3 Drawing Sheets

LASER DIODE PUMPED SOLID STATE LASER CONSTRUCTION

FIELD OF THE INVENTION

The present invention relates to a diode pumped laser and more particularly to an improved laser diode pumped solid state laser construction. The present invention also includes improved heat dissipation means and improved temperature control means for more effectively and efficiently controlling the operating temperatures of the laser diode pumped solid state laser construction. The present invention also facilitates independent adjustment or tuning of the separate laser portions.

BACKGROUND OF THE INVENTION

Diode pumped lasers involve semiconductor diodes which laser when excited by electrical current. The lasing portions of the semiconductors, typically PN junctions, are positioned near a laser medium, such as a crystal, so that laser energy from the semiconductor diodes is directed into the medium, either directly or by lenses. When "pumped" by the laser energy from the diodes, the energy excitation levels build up within the atomic structure of the medium. The medium, which can be elongated round, square or flat can be provided with a mirror or a reflective coating at each or one end, focuses the laser energy along the main axis of the medium. The laser beam exits through one of the mirrors, or through a portion of one of the mirrors that is partially transparent.

The term "laser head" is often used to refer to the assembly which comprises the gain medium, the lasing diode(s), the mirror(s), and any mounting devices which hold those components in their proper positions and alignment. A laser head can also include other components that are directly attached to the laser head assembly, including possibly a housing and any necessary heat sinks. Typically, a laser head will include one or more electrical ports for the leads which supply the electrical energy from an external power source to the laser diode.

The lasing diode used to excite or "pump" a laser medium can be mounted at one end of the medium, or along the side of the medium. Mounting lasers at one end are limited in power since only one diode or a small number of diodes can be mounted in close proximity to the end of the medium mounting. Lasers along the side can be more powerful, since many diodes can be mounted on diode pumped lasers. For additional information on diode pumped lasers see, e.g., W. Koechner, *Solid State Laser Engineering* (Springer-Verlad, New York, 1988), the article *"Diode-Pumped Solid-State Lasers Have Become A Mainstream Technology"* by G. T. Forrest in *Laser Focus/Electro-Optics*, November 1987, pp. 62–74, the article *"Advances in Diode Laser Pumps"* by W. Streifer et al in *IEEE Journal of Quantum Electronics* 24 (6): 883–984 (June 1988), and various patents such as U.S. Pat. Nos. 4,864,585; 4,805,177; 4,901,324; and 5,084,886.

In order to obtain optimal laser beam quality and output power it is important to be able to control adjustment of the beam in the axial direction. Typically, most laser diode pumped solid state lasers require complex assemblies and complex alignment equipment to accurately position the optical components. Since these lasers require complex assemblies and alignment equipment, this adds to the cost of the laser. Additionally, these complex assemblies and alignment equipment add to the volume and weight of the laser.

Another problem associated with the use of laser diode pumped solid state lasers is that laser diodes generate substantial amounts of heat and therefore must be cooled if they are to produce substantial outputs. If not properly cooled, high temperatures (i.e., increased vibrations of the atomic lattices in the semiconductor material) can damage or destroy the diodes. The laser medium is also subjected to high heat and must be cooled for comparable reasons. High temperatures can also cause diodes and medium to become misaligned.

The magnitude and importance of the cooling problem can be seen in perspective by considering the efficiencies of diode pumped lasers. Efficiency is measured by dividing the amount of power carried in the laser beam (expressed in watts) by the total wattage consumed by the laser equipment. For a typical side pumped laser to generate a laser beam carrying one watt of energy it must dissipate as much as 100 watts of input energy, most of which must be dissipated as heat. Many lasers which cannot otherwise cope adequately with the problem of cooling must be operated only in a pulsed mode, i.e., their output is limited to short bursts of laser energy. Between pulses, such lasers must be deactivated so that they are allowed to cool. However, it is often desirable to operate lasers in the continuous wave (CW) mode.

Thus, as can be seen, there remains a need for an improved laser diode pumped solid state laser which is simple to assemble and is relatively easy to accurately align the optical components. Also there is a need for improved methods of removing heat from the immediate vicinity of the diode pumped sources and laser gain mediums in diode pumped lasers. There is also a need the other methods of increasing the power and/or efficiency of diode pumped lasers. Any device or arrangement which provides for more efficient use of the excitation energy from the diodes in exciting the laser medium is desirable in every application. Additionally, any configuration which permits a laser head having a limited size to put out a more powerful laser beam is useful in any application where higher power is desirable. Both factors are especially important for lasers that operate in a continuous wave mode and for lasers used in devices where volume and weight are limited or tightly constrained, such as in satellite applications and applications which involve miniaturized electronics.

SUMMARY OF THE INVENTION

The present invention, in one form, is a laser device comprising a base having an optical channel and a laser diode pump source mounted to the base and in thermal conductive relation thereto. The laser diode pump source is positioned in alignment with the optical channel and a laser gain medium is mounted in the optical channel. A ball lens can be mounted in the optical channel and positioned between and aligned with the laser diode pump source and the laser gain medium. An energy source is provided for energizing the laser diode pump source to produce a lasing condition and to produce an output of lasing energy. The lasing energy output is directed to the ball lens and focused on the laser gain medium to excite the laser gain medium to establish a lasing condition and generate a laser beam. A mirror is mounted in alignment with the optical channel adjacent the laser gain medium.

This construction provides the advantages of economy, efficiency, compact size, light weight, and ease in alignment of optical elements. This construction is also advantageous because it enables each portion of the assembly, the laser gain medium portion, and the laser diode pump source portion, to be separated for maintenance, for removal, and for separately adjusting or tuning the different components.

In another embodiment of the present invention, the laser device comprises an unitary support structure having a first end and a second end and an optical channel therebetween. A laser diode pump source is mounted to the first end of the support structure and in thermal conductive relation thereto. The laser diode pump source is positioned in alignment with the optical channel, and a laser gain medium is mounted in the optical channel. The laser gain medium, of course, is capable of being excited to establish a lasing condition. A lens is mounted in the optical channel and is positioned between the laser diode pump source and the laser gain medium. An energy source is provided for energizing the laser diode pump source to produce a lasing condition therein thereby producing an output of lasing energy. The output is directed at the lens and focused on the laser gain medium to excite the laser gain medium to establish a lasing condition for producing a beam. An output mirror is mounted to the second end of the support structure and is aligned with the optical channel.

One object is to provide a design which can be completely sealed air tight or vacuum sealed so that the entire laser portion, ie., pump source, gain medium and all optical components is protected so as to benefit extreme conditions in environments.

One object of the present invention is to provide an improved laser diode pumped solid state laser construction which provides a relatively high usable energy output from a highly compact, relatively lightweight laser head.

Another object of the present invention is to provide a laser diode pumped solid state laser construction which allows for easy alignment and adjustment of the optical components of the laser.

Still another object of the present invention is to provide a highly efficient laser head.

Another object of the present invention is to provide an improved laser diode pumped solid state laser construction with improved heat control and heat removal means in a compact construction and design.

DETAILED DESCRIPTION OF THE DRAWINGS

Figure 1:
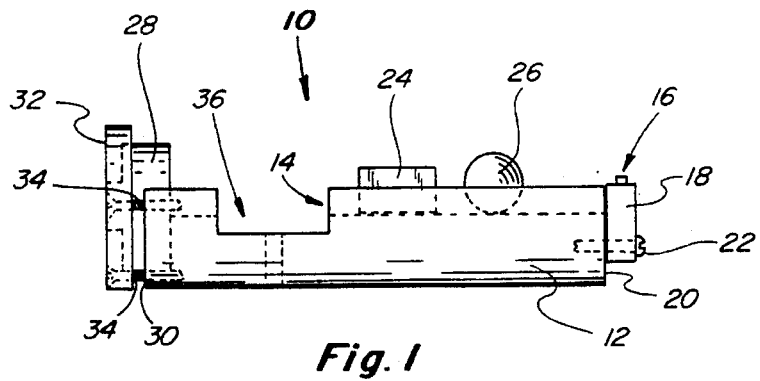
FIG. 1 is a side view of a diode pumped laser device constructed according to one embodiment of the present invention.
Figure 2:
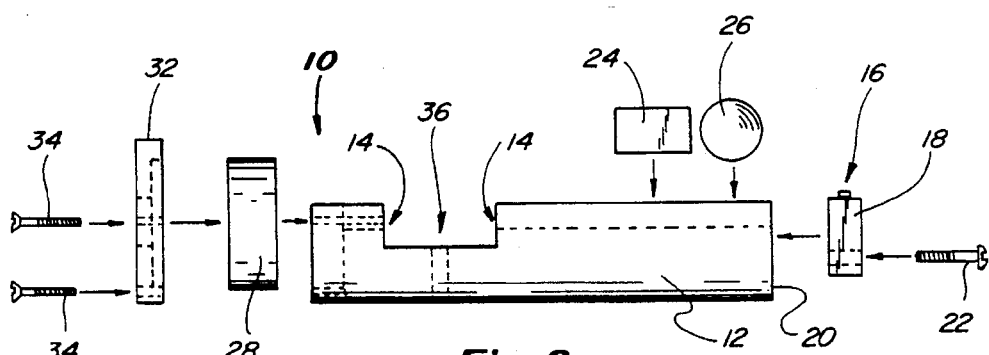
FIG. 2 is an exploded view of the diode pumped laser device of FIG. 1.

Referring now to the drawings, wherein like numerals refer to like items, number 10 in FIGS. 1 and 2 refers to a diode pumped laser device constructed according to one embodiment of the present invention. The device 10 includes a laser base 12 having an optical channel 14 formed within the base 12. The base 12 is manufactured from heat conductive material such as aluminum and can be formed of a single piece of machined metal. The optical channel 14 runs the length of the base 12 and the optical channel 14 has a predefined width. A laser diode pump source 16 is soldered to a heat sink 18 which is mounted to an end 20 of the base 12 by a screw 22 with the laser diode pump source 16 aligned with the optical channel 14. A laser gain medium or crystal 24 is mounted within the optical channel 14. The size and shape of the crystal 24 is such that it fits within the optical channel 14. The crystal 24 is securely affixed within the optical channel 14 by any desired means, such as heat-resistant cement or a suitable adhesive material. Silicon based glues have been used for this purpose.

The laser gain medium 24 consists of a crystal having a regular and repeated atomic lattice structure, or a glass which does not have a regular atomic lattice structure, or any other type of solid medium that functions as a laser gain medium. Since most laser diode pumped solid state lasers use crystals such as neodymium atoms in a crystalline matrix of yttrium-aluminum-garnet (Nd:YAG) or neodymium atoms in a matrix of yttrium-lithium-fluoride (Nd:YLF), the term "crystal" is occasionally used herein for convenience.

A ball lens 26 is mounted in the optical channel 14 in alignment between the laser diode pump source 16 and the crystal 24. The ball lens 26 is sized and shaped to fit within the optical channel 14 and may be securely affixed within the optical channel 14 by same means as crystal gain medium. A mirror 28 is mounted in alignment with the optical channel 14 at the other end 30 of the base 12. The mirror 28 is positioned adjacent to the crystal 24 in opposed relationship to the ball lens 26. A mirror cap 32 covers the mirror 28 and adjustment screws 34 are used to secure the mirror cap 32 to the end 30 of the base 12. The adjustment screws 34 allow the mirror 28 to be adjusted or tilted to provide for maximum output power and optimum beam quality of the lasing gain medium 24. The base 12 further includes a platform area 36 for mounting other optical elements, as will be explained. The platform area 36 is also aligned with the optical channel 14.

Figure 3:
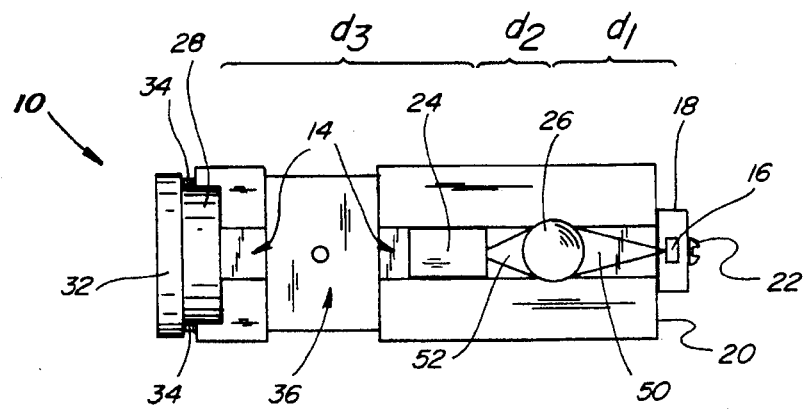
FIG. 3 is a top view of the diode pumped laser device of FIG. 1.

Referring now to FIG. 3, the laser diode pump source 16 is excited by applying a voltage thereacross which then causes the laser diode pump source 16 to emit laser radiation such as a laser diode laser beam 50. Laser diode laser beam 50 is directed at the ball lens 26 and a laser diode pump beam 52 is projected from the ball lens 26 to the crystal 24. The construction of the device 10 is such that several of the components may be adjusted to optimize beam quality. The distance depicted as $d_1$ in FIG. 3, which is the distance from the laser diode pump source 16 to the center of the ball lens 26, may be adjusted to determine the type of beam quality which will be produced. The distance represented as $d_2$, in FIG. 3, which is the distance from the center of the ball lens 26 to the back of the crystal 24, may be adjusted to produce the highest pump density and therefore the optimal conversion of laser diode pump wavelength to lasing gain medium wavelength.

Physical adjustments of the components, such as the ball lens 26 and the crystal 24, are made in an axial dimension along the optical channel 14. The axial direction is the most critical direction the obtaining optimal beam quality and output power.

Figure 4:
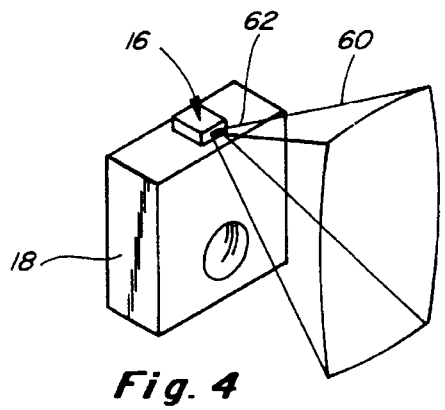
FIG. 4 is an enlarged perspective view of the laser diode pump source shown in FIG. 1 showing a beam profile of lasing radiation emitted from the laser diode pump source.

To illustrate the high degree of miniaturization that has been achieved using the configuration of the subject invention, typical sizes of some of the components used in one preferred embodiment are provided in the following discussion. These particular sizes, which balance manufacturing, alignment, testing, and handling ease against the desire for compactness in the assembled unit, are not to be construed as limitations, since the components can be made either larger or smaller to satisfy the particular goals and constraints for any specific desired use. With reference to FIG. 4, the laser diode pump source 16 is shown rectangular in shape has a lasing area typically a few tenths of a micrometer thick by 100 to 150 micrometers in width. This particular geometry produces a beam profile 60 from an emitting stripe 62, as shown in FIG. 4. The largest spread (largest beam divergence) over a given distance is for the vertical direction which is the smallest dimension, typically 0.1 to 1 micrometer, of the emitting stripe 62. Due to the fact that the beam divergence in the vertical plane and the horizontal plane change at different rates positioning of the ball lens 26 brings both planes to a fairly small spot size with fairly equal dimensions in the vertical and horizontal directions.

The size and shape of the laser diode pump beam 52 which enters into the back of the crystal 24 is very important due to the fact that this dictates what will be the shape of the beam that the crystal 24 will generate upon lasing, assuming that the mirror 28 is adjusted for optimum feedback on axis with the laser diode pump beam 52. The actual gain laser resonator cavity length is defined as being between the back end of the crystal 24 closest to the laser diode and the front surface of the mirror 28 and this distance is represented as $d_3$ in FIG. 3. The back end of the crystal 24 is coated with an optical coating which is highly transparent to the wavelength of the laser diode pump beam 52 and highly reflective to the wavelength of the beam from the lasing crystal 24.

The arrangement of the base 12, the laser diode pump source 16, the ball lens 26, the crystal 24, and the mirror 28 is such that the device 10 can fit into a casing having dimensions of less than ⅝ inches in diameter and as little as ⅝ inches in length. Again, this illustrates the high degree of miniaturization that has been achieved using the configuration of the subject invention.

Figure 5:
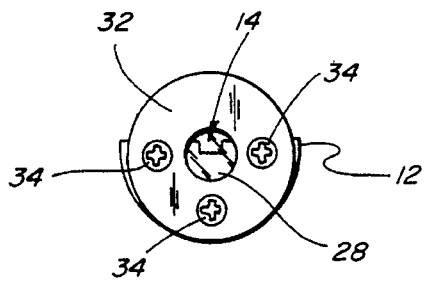
FIG. 5 is a left end view of the diode pumped laser device of FIG. 1.

FIG. 5 shows the mirror cap 32 mounted to the base 12 by the adjustment screws 34. The optical channel 14 can be seen through an opening 38 in the mirror cap 32 and the mirror 28. The laser beam from the crystal 24 will be projected through opening 38. As previously discussed, one or more of the adjustment screws 34 may be adjusted to tilt the mirror 28 to obtain the maximum output power and optimum beam quality of the lasing gain medium 24.

Figure 6:
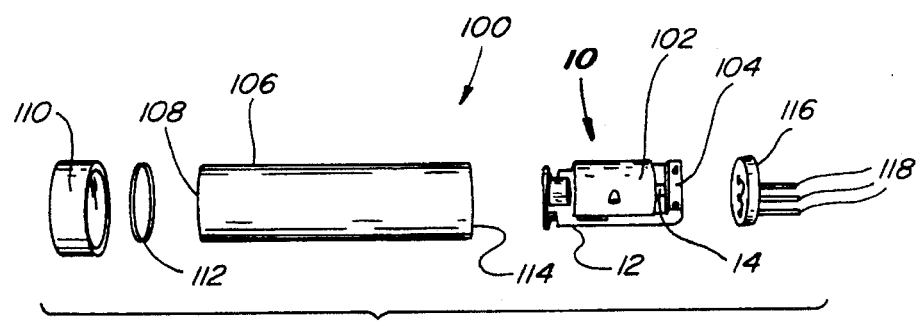
FIG. 6 is an exploded view of a laser device showing the several components of the laser device.

With reference now to FIG. 6, an exploded view of a finished laser construction 100 is illustrated. The device 10 has a cover 102 placed over the base 12 to protect the components within the optical channel 14. A bracket 104 is also placed over the laser diode pump source 16. The device 10 and cover 102 are sized and shaped to be inserted into a casing 106. One end 108 of the casing 106 is adapted to have an end cap 110 threaded thereon with an "O" ring 112 placed between the end 108 and the end cap 110 to seal the end 108. The other end 114 of the casing 106 has an end plug 116 that is adapted to cover and seal the end 114. The end plug 116 also has electrical pins 118 which connect to the laser diode pump source 16 and extend out of the end plug 116.

The laser base 12 is semi-circular in cross-section which allows it to be easily inserted into the casing 106. The casing 106 is an ideal surface to radiate and dissipate heat in a 360° pattern and acts as another heatsink for the device 10. Additionally, the casing 106 is an ideal structure for integration into a wide assortment of fixtures and instruments. The optical channel 14 is constructed in such a manner that its width is the same as the diameter of the ball lens 26 and the crystal 24 which allows for precise alignment of these components. The optical channel 14 is typically cut or formed into the center of the laser base 12 so that when the device 10 is installed into the casing 106 the laser beam produced by the device 10 is centered in the center of the casing 106. This also allows for additional optical elements, such as lenses, mirrors, or polarizing devices, to be positioned in the casing 106 and centered with respect to the laser beam.

Figure 7:
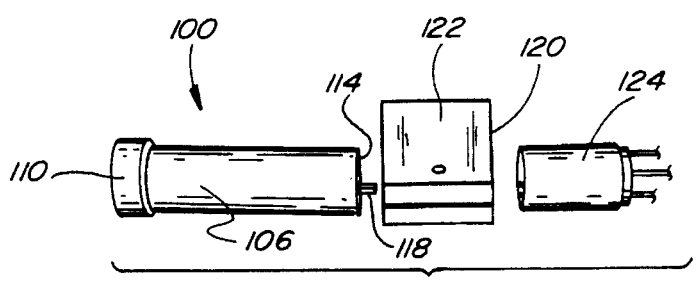
FIG. 7 is a perspective view of the laser device of FIG. 6 shown assembled with other elements which are used to form a sealed laser construction.
Figure 8:
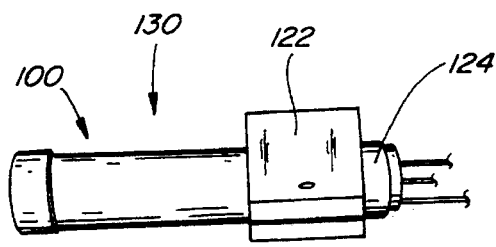
FIG. 8 is a perspective view of the assembled laser construction shown in FIG. 7.

The finished laser construction 100 is adapted to have the end 114 placed in an opening 120 in a block 122, as is shown in FIG. 7. The block 122 is further adapted to receive a power supply 124 which connects to the electrical pins 118. In this fashion power is supplied to the laser diode pump source 16 through the electrical pins 118 from the power supply 124. The block 122 serves the dual functions of providing additional heatsinking material tier dissipating heat from the device 10 and of providing a base for mounting purposes. FIG. 8 illustrates a completed construction 130 which includes the finished laser construction 100, the block 122, and the power supply 124.

Figure 9:
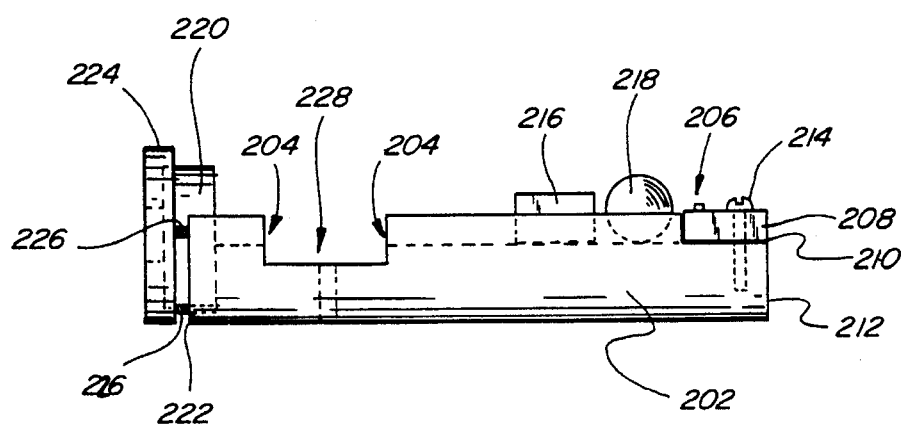
FIG. 9 is a side view of a diode pumped laser device constructed according to another embodiment of the present invention.
Figure 10:
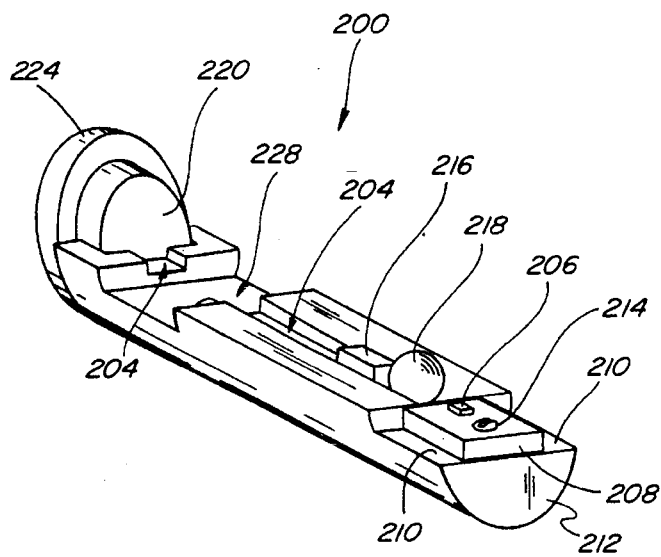
FIG. 10 is a perspective view of the diode pumped laser device shown in FIG. 9.

FIGS. 9 and 10 illustrate another embodiment of a diode pumped laser device 200 constructed according to the present invention. The device 200 includes a laser base 202 having an optical channel 204 formed within the base 202. The base 202 is manufactured from heat conductive material such as aluminum and can be formed of a single piece of machined metal. A laser diode pump source 206 is soldered to a heat sink 208 which is mounted on a platform surface 210 at an end 212 of the base 202 by a screw 214 and the laser diode pump source 206 is aligned with the optical channel 204. A laser gain medium or crystal 216 is mounted within the optical channel 204. The size and shape of the crystal 216 is such that it fits within the optical channel 204. The crystal 216 is securely affixed within the optical channel 204 by any desired means, such as heat-resistant cement. The laser gain medium 216 typically consists of a crystal having a regular and repeated atomic lattice structure, or a glass which does not have a regular atomic lattice structure, or any other type of solid medium that functions as a laser gain medium. An example of such a crystal 216 is Nd:YAG or Nd:YLF.

A ball lens 218 is mounted in the optical channel 204 in alignment between the laser diode pump source 206 and the crystal 216. The ball lens 218 is sized and shaped to tit within the optical channel 204. A mirror 220 is mounted in alignment with the optical channel 204 at the other end 222 of the base 202. The mirror 220 is also in alignment with the crystal 216 and the ball lens 218. A mirror cap 224 covers the mirror 220 and adjustment screws 226 are used to secure the mirror cap 224 to the end 222 of the base 202. The adjustment screws 226 allow the mirror 220 to be adjusted if needed. The base 202 further includes a platform area 228 for mounting other optical elements, if required. The platform area 228 is also aligned with the optical channel 204. The device 200 is also adapted to be used with the block 122 and the power supply 124 to them a completed construction 130.

Figure 11:
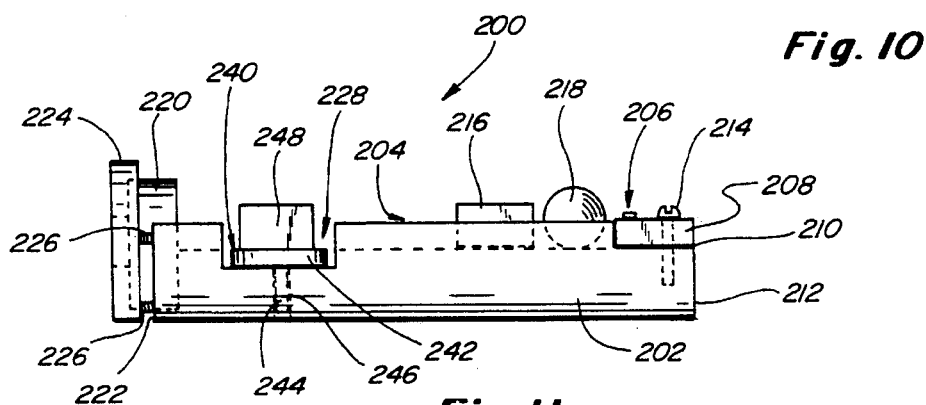
FIG. 11 is a side view of the diode pumped laser device shown in FIG. 9 having an adjustable platform mounted thereon.

As shown in FIG. 11, an adjustable platform 240 is mounted in the base 202 in the platform area 228. The adjustable platform 240 includes a pedestal 242 and a pin 244 inserted into an opening 246 in the platform area 228 of the base 202. The adjustable platform 240 is adapted to be rotated with respect to the platform area 228. A frequency doubling crystal or a second harmonic generator (SHG) crystal 248 is positioned on the adjustable platform 240. The SHG crystal 248 is positioned in the optical channel 204 between the crystal 216 and the mirror 220 which is also within what is defined as the optical resonator cavity of the device 200. The SHG crystal 248 is slightly angled with respect to the beam which is emitted from the crystal 216.

The SHG crystal 248 converts a beam having an invisible infra red wavelength from the crystal 216 into a visible wavelength beam which corresponds to doubling the frequency of the beam or halving the wavelength of the beam. For example, if the laser diode pump source 206 generates laser radiation at a wavelength of 806 nanometers (nm), the optimal absorption wavelength for a crystal 216 which is made of Nd:YAG then the crystal 216 will lase and emit a beam having a wavelength of 1064 nm. The SHG crystal 248 will in turn halve the 1064 nm beam and generate a beam having a wavelength of 532 nm. The 532 nm wavelength beam is a visible green wavelength. Additionally, the adjustable platform 240 having the SHG crystal 248 positioned on it may be used in conjunction with the device 10 with the adjustable platform 240 mounted in the platform area 36.

Figure 12:
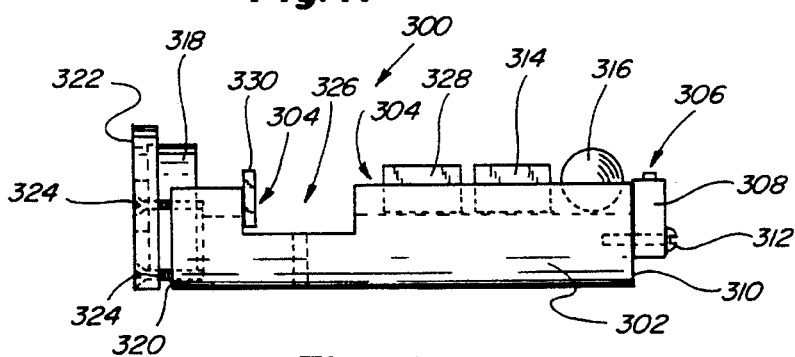
FIG. 12 is a side view of a diode pumped laser device constructed according to yet another embodiment of the present invention.

With reference to FIG. 12, another embodiment of a diode pumped laser device 300 is shown which includes several modifications to the embodiment described with respect to FIGS. 1–3. The device 300 includes a base 302 having an optical channel 304 formed within the base 302. The base 302 is manufactured from heat conductive material such as aluminum and can be brined of a single piece of machined metal. The optical channel 304 runs the length of the base 302 and the optical channel 304 has a predefined width. A laser diode pump source 306 is soldered to a heat sink 308 which is mounted to an end 310 of the base 302 by a screw 312 and the laser diode pump source 306 is aligned with the optical channel 304. A laser gain medium or crystal 314 is mounted within the optical channel 304. The size and shape of the crystal 314 is such that it fits within the optical channel 304. The crystal 314 is securely affixed within the optical channel 304 by any desired means, such as heat-resistant cement or a suitable adhesive material. The laser gain medium 314 is typically a crystal of Nd:YAG or Nd:YLF.

A ball lens 316 is mounted in the optical channel 304 in alignment between the laser diode pump source 306 and the crystal 314. The ball lens 316 is sized and shaped to fit within the optical channel 304 and may be securely affixed within the optical channel 304 by any desired means. A mirror 318 is mounted in alignment with the optical channel 304 at the other end 320 of the base 302. A mirror cap 322 covers the mirror 318 and adjustment screws 324 are used to secure the mirror cap 322 to the end 320 of the base 302. The adjustment screws 324 allow the mirror 318 to be adjusted or tilted to provide for maximum output power and optimum beam quality of the lasing gain medium 314. The base 302 further includes a platform area 326 for mounting other optical elements, such as the previously discussed adjustable platform 240 having a SHG crystal 248 positioned on it. The platform area 326 is also aligned with the optical channel 304.

Also positioned in the optical channel 304 is another optical element such as a potassium-titanyl-phosphate (KTP) crystal 328 which is used to double the frequency of the beam produced from the crystal 314. A quarter wave plate or a polarization retarder 330 may also be positioned in the optical channel 304 between the KTP crystal 328 and the mirror 318.

Figure 13:
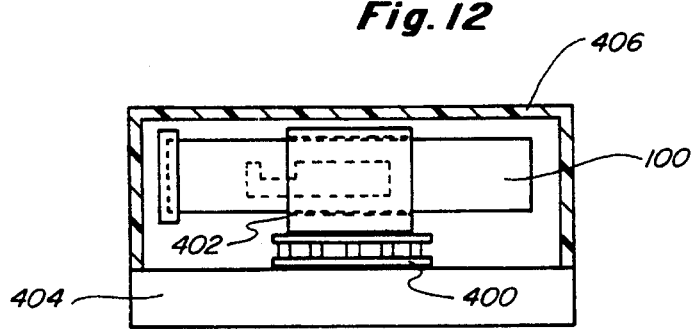
FIG. 13 is a partial cross-sectional view of the laser construction shown in FIG. 12 showing heat sinks and a thermoelectric cooler used to cool the laser construction.

FIG. 13 illustrates a thermoelectric cooler 400 used to maintain a constant temperature for the entire laser construction 100. A heat spreader block 402 is placed between the thermoelectric cooler 400 and the laser construction 100. The thermoelectric cooler 400, the laser construction 100, and the heat spreader block 402 may be mounted on a heat sink base 404. A plastic cover 406 is used to cover the thermoelectric cooler 400, the laser construction 100, and the heat spreader block 402 over the heat sink base 404. This construction allows for maximum output power by thermally turning the output of the laser diode (0.25 nm wavelength shift per °C.) to the maximum absorption of the Nd:YAG crystal or other laser gain medium. Optimizing the temperature also maximizes the doubling efficiency of the KTP crystal which is angle sensitive as a function of temperature. Cooling allows for the maximum output power, stable output power over time, and for the laser construction 100 to be operated in the CW mode.

Thus there has been shown and described several embodiments of a novel laser device which fulfills all of the objects and advantages sought therefor. It will be apparent to those skilled in the art, however, that various changes, modifications, variations and other uses and applications which do not depart from the spirit and scope of the invention are possible. All such changes, modifications, variations and other uses and applications which do not depart from the spirit and scope of the invention are deemed to be covered by the invention which is limited only by the claims which follow.

What is claimed is:

1. A laser device comprising:

an unitary base having an elongated open sided optical channel of relatively uniform rectangular cross section extending along the length thereof;

a laser diode pump source mounted to the base and in thermal conductive relation thereto, the laser diode pump source positioned in alignment with the optical channel;

a laser gain medium mounted in the optical channel and capable of being excited by the output of the pump source to establish a lasing condition, the laser gain medium positioned within the optical channel in optical alignment with the output of the laser diode pump source;

a lens mounted in the optical channel between the laser diode pump source and the laser gain medium in optical alignment with the laser diode pump source and the laser gain medium, means enabling adjusting the orientation of the lens within the optical channel relative to the laser diode pump source and the laser gain medium to optimize the optical communication therebetween, the lens having a circular cross section different from the rectangular cross section of the optical channel such that contact between the lens and the optical channel is minimized thereby reducing thermal conductivity between the lens and the base;

means for energizing the laser diode pump source to produce a lasting condition therein and an output of lasing energy, the output directed to the lens and focused thereby on the laser gain medium to excite the laser gain medium to establish a lasting condition for producing a laser beam, the orientations of the lens and the pump source optimizing the output power of the laser beam; and a mirror mounted on the base in alignment with the optical channel on the opposite side of the laser gain medium from the pump source, and means for adjusting the orientation of the mirror with respect to the base along at least two different directions.

2. The laser device of claim 1 wherein the adjusting means comprises a mirror cap mounted to the base by adjustment screws, the adjustment screws for selectively adjusting the mirror and the mirror cap.

3. The laser device of claim 1 further comprising a platform area positioned between the laser gain medium and the mirror and in alignment with the optical channel.

4. The laser device of claim 1 further comprising a second laser gain medium mounted in the optical channel adjacent to and in alignment with the laser gain medium.

5. The laser device of claim 4 wherein the second optical element is an KTP crystal.

6. The laser device of claim 1 wherein the laser gain medium is a rod of Nd:YAG crystal.

7. The laser device of claim 1 wherein the lens is a ball lens.

8. The laser device of claim 1 further comprising a thermoelectric cooler mounted to the laser device, the thermoelectric cooler for cooling the laser gain medium and the laser diode pump source.

9. The laser device of claim 1 wherein the laser device is operated in the continuous wave mode.

10. A laser device comprising:

an unitary support structure having a first end and a second end and an open sided optical channel of relatively uniform rectangular cross section along the length thereof extending between the first and second ends;

a laser diode pump source mounted adjacent to the first end of the support structure and in thermal conductive relative thereto, means to adjust the orientation of the laser diode pump source so that the output therefrom when energized is in alignment with the optical channel;

a laser gain medium mounted in the optical channel in optical alignment with the output of the laser diode pump source and capable of being excited by the output of the pump source to establish a lasing condition;

a lens mounted in the optical channel between the laser diode pump source and the laser gain medium, the lens having a circular cross section different from the rectangular cross section of the optical channel such that contact between the lens and the optical channel is minimized thereby reducing thermal conductivity between the lens and the support structure;

means for enabling energizing the laser diode pump source to produce a lasing condition therein and to produce an output of lasing energy, the output directed to the lens and focused thereby on the laser gain medium to excite the laser gain medium to establish a lasing condition for producing a laser beam, means for adjusting the orientation of the lens to optimize the output power of the laser beam; and output mirror means mounted adjacent to the second end of the support structure in position to be aligned with the optical channel and including means for adjusting the orientation of the mirror means with respect to the second end of the support structure along at least two different directions.

11. The laser device of claim 10 wherein the adjusting means comprises a mirror cap mounted to the base by adjustment screws for adjusting the orientation of the output mirror means.

12. The laser device of claim 10 wherein the output mirror means comprises a mirror mounted in the optical channel and adapted for being selectively orientated to provide for maximum output power and optimum quality of the beam.

13. The laser device of claim 10 further comprising a platform area positioned between the laser gain medium and the output mirror means and in alignment with the optical channel.

14. The laser device of claim 10, further comprising a second laser gain medium mounted in the optical channel adjacent to and in alignment with the laser gain medium.

15. The laser device of claim 14 wherein the second optical element is an KTP crystal for frequency doubling.

16. The laser device of claim 10 wherein the laser gain medium is a rod of Nd:YAG crystal.

17. The laser device of claim 10 wherein the lens is a ball lens.

18. The laser device of claim 10 further comprising a thermoelectric cooler mounted to the laser device, the thermoelectric cooler for cooling the laser gain medium and the laser diode pump source.

19. The laser device of claim 10 wherein the laser device is operated in the continuous wave mode.

20. A laser head comprising:

an unitary support structure having a first end and a second end and an open sided optical channel of relatively uniform rectangular cross section extending along the length thereof between the first and second ends;

a laser diode pump source mounted adjacent to the first end of the support structure and in thermal conductive relation thereto, the laser diode pump source producing an output in alignment with the optical channel;

a laser gain medium mounted in the optical channel in position to be excited by the output of the pump source to establish a lasing condition;

a lens mounted in the optical channel between the laser diode pump source and the laser gain medium in position to be optically aligned with output of the laser didode pump source and the laser gain medium, the lens being selectively positioned within the optical channel relative to the laser diode pump source and the laser gain medium to optimize the optical communication therebetween, and the lens having a circular cross section different from the rectangular cross section of the optical channel such that contact between the lens and the optical channel is minimized thereby reducing thermal conductivity between the lens and the support structure;

means for energizing the laser diode pump source to produce a lasing condition therein and to produce an output of lasing energy, the output directed to the lens and focused thereby on the laser gain medium to excite the laser gain medium to establish a lasing condition producing a laser beam; and a mirror mounted adjacent to the second end of the support structure in alignment with the optical channel including means for adjusting the orientation of the mirror with respect to the second end of the support structure along at least two different directions.

21. The laser head of claim 20 further comprising a platform area positioned between the laser gain medium and the mirror and in alignment with the optical channel.

22. The laser head of claim 21 wherein the platform area comprises means for receiving an optical element.

* * * * *

UNITED STATES PATENT AND TRADEMARK OFFICE
CERTIFICATE OF CORRECTION

PATENT NO. : 5,561,684
DATED : October 1, 1996
INVENTOR(S) : Danny W. Martin

It is certified that error appears in the above-indentified patent and that said Letters Patent is hereby corrected as shown below:

Column 5, line 18, "the" should be --for--.

Column 7, line 1, "tit" should be --fit--.

Column 7, line 13, "them" should be --form--.

Column 7, line 48, "brined" should be --formed--.

Column 9, line 10, "lasting" should be --lasing--.

Column 9, line 13, "lasting" should be --lasing--.

Column 9, line 53, "relative" should be --relation--.

Column 10, line 26, "10," should be --10--.

Column 10, line 58, "didode" should be --diode--.

Signed and Sealed this

Eighteenth Day of February, 1997

Attest:

BRUCE LEHMAN

Attesting Officer

Commissioner of Patents and Trademarks